(12) United States Patent
Kwak et al.

(10) Patent No.: US 9,893,338 B2
(45) Date of Patent: Feb. 13, 2018

(54) SECONDARY BATTERY

(71) Applicant: SAMSUNG SDI CO., LTD., Yongin-si, Gyeonggi-do (KR)

(72) Inventors: Seung-Ho Kwak, Yongin-si (KR); Yong-Chul Seo, Yongin-si (KR); Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 127 days.

(21) Appl. No.: 14/645,286

(22) Filed: Mar. 11, 2015

(65) Prior Publication Data

US 2015/0295217 A1    Oct. 15, 2015

(30) Foreign Application Priority Data

Apr. 14, 2014  (KR) .................. 10-2014-0044015

(51) Int. Cl.
  *H01M 2/02*   (2006.01)
  *H01M 2/10*   (2006.01)
  *H01M 2/18*   (2006.01)
  *H01M 10/04*   (2006.01)
  *H01M 10/42*   (2006.01)

(52) U.S. Cl.
  CPC .............. *H01M 2/18* (2013.01); *H01M 2/02* (2013.01); *H01M 2/10* (2013.01); *H01M 10/0468* (2013.01); *H01M 10/4235* (2013.01)

(58) Field of Classification Search
None
See application file for complete search history.

(56) References Cited

U.S. PATENT DOCUMENTS

2006/0024578 A1 2/2006 Lee
2011/0117402 A1 5/2011 Kim et al.
(Continued)

FOREIGN PATENT DOCUMENTS

EP 2 309 569 A1 4/2011
EP 2309569 A1 * 4/2011
(Continued)

OTHER PUBLICATIONS

EPO Search Report dated Jul. 23, 2015, for corresponding European Patent application 15162755.1, (6 pages).
(Continued)

*Primary Examiner* — Daniel Gatewood
(74) *Attorney, Agent, or Firm* — Lewis Roca Rothgerber Christie LLP

(57) ABSTRACT

A secondary battery includes a contact portion on a bottom retainer that contacts a bottom of a case, thus performing a tension function. The secondary battery includes an electrode assembly having a first electrode, a second electrode, and a separator between the first and second electrodes; a case accommodating the electrode assembly therein, having a top and a bottom and an opening in the top of the case; a cap plate closing the opening of the case; a bottom retainer on an upper surface of the bottom of the case, the bottom retainer including a support portion supporting the electrode assembly and at least one contact portion contacting the bottom of the case. As such, the contact portion may absorb external shocks, thus increasing durability and enhancing safety of the secondary battery.

12 Claims, 5 Drawing Sheets

(56) References Cited

U.S. PATENT DOCUMENTS

2011/0081573 A1 7/2011 Kim et al.
2012/0021274 A1 1/2012 Kim et al.
2012/0251872 A1 10/2012 Kim

FOREIGN PATENT DOCUMENTS

| EP | 2 328 204 A1 | | 6/2011 |
| EP | 2328204 A1 | * | 6/2011 |
| EP | 2 410 594 A1 | | 1/2012 |
| JP | 2006260905 A | * | 9/2006 |
| KR | 10-2008-0030702 | | 4/2008 |
| KR | 10-2012-0112992 | | 10/2012 |

OTHER PUBLICATIONS

European Examination Report dated Mar. 20, 2017 of the corresponding European Patent Application No. 15162755.1 (6 pages).

* cited by examiner

SECONDARY BATTERY

CROSS-REFERENCE TO RELATED APPLICATION

This application claims priority to and the benefit of Korean Patent Application No. 10-2014-0044015, filed on Apr. 14, 2014, in the Korean Intellectual Property Office, the entire contents of which are incorporated herein by reference in their entirety.

BACKGROUND

1. Field

The present invention relates to a secondary battery.

2. Description of the Related Art

A secondary battery is a battery that may be repeatedly charged or discharged, unlike a primary battery which may not be repeatedly charged or discharged. A low-capacity secondary battery may be used for a portable and small electronic device, such as a mobile phone, a notebook computer or a camcorder, and a high-capacity secondary battery may be used as a power source for driving a motor of a hybrid vehicle or the like.

Recently, a high-output secondary battery with high-energy density using a non-aqueous electrolyte has been developed. The high-output secondary battery is made by connecting a plurality of secondary batteries in series, and is used in driving a motor of a device requiring high power, for example, an electric vehicle.

The secondary battery includes an electrode assembly, a case, a cap plate, and an electrode terminal. The electrode assembly includes a separator, and an anode and a cathode provided on opposite surfaces of the separator. The case accommodates the electrode assembly therein and the cap plate closes an opening of the case. The electrode terminal passes through the cap plate and is electrically connected to the electrode assembly.

SUMMARY

An aspect of the present invention provides a secondary battery having a contact portion formed on a bottom retainer and contacting a bottom of a case, thus performing a tension function.

Another aspect of the present invention provides a secondary battery having an edge of a bottom retainer formed in a wave pattern, thus providing a path for gas discharged from an electrode assembly when a fault occurs in a battery cell.

A further aspect of the present invention provides a secondary battery having a hole formed at a predetermined position on a bottom retainer, thus enabling the flow of an electrolyte.

According to an embodiment of the present invention, a secondary battery includes an electrode assembly including a first electrode, a second electrode, and a separator between the first and second electrodes; a case having a top and a bottom and accommodating the electrode assembly therein, with an opening in the top of the case; a cap plate that closes the opening of the case; and a bottom retainer on an upper surface of the bottom of the case, wherein the bottom retainer includes a support portion to support the electrode assembly, and at least one contact portion contacting the bottom of the case.

The support portion of the bottom retainer may be formed in a shape of a flat plate.

Further, the contact portion of the bottom retainer may extend from a predetermined position on a lower side of the support portion toward the bottom of the case.

The contact portion may include an inclined portion that extends obliquely from the support portion toward the bottom of the case, and a horizontal portion that extends from an end of the inclined portion and parallel to the bottom of the case.

The contact portion may include inclined portions that are adjacent to each other by twos, the adjacent inclined portions being inclined such that they are spaced apart a first distance at a portion adjacent the support portion and spaced apart a second distance at a portion adjacent the horizontal portion, wherein the second distance is greater than the first distance.

The support portion may include at least one hole.

The hole may be in the support portion located above the contact portion.

At least a portion of an edge of the hole may have a wave pattern.

At least a portion of an edge of the support portion may have a wave pattern.

Further, the support portion and the contact portion may be alternately arranged, and a vertical section of the bottom retainer that contacts a long side of the case may have an embossing shape.

The bottom retainer may be an insulation member.

As is apparent from the above description, the present invention includes the contact portion of the bottom retainer, providing a tension function that may continuously push the electrode assembly upward, thus preventing the electrode assembly from being unwound due to its own weight and vertical vibrations.

Further, an aspect of the present invention provides improved safety of the secondary battery, and the contact portion of the bottom retainer absorbs external shocks, thus enhancing durability.

Furthermore, an aspect of the present invention provides the hole formed at a predetermined position on the bottom retainer, thus allowing the electrolyte in the bottom of the case to be smoothly absorbed by the electrode assembly and thereby minimizing or preventing degradation of the performance of the secondary battery.

BRIEF DESCRIPTION OF THE DRAWINGS

Example embodiments are described more fully hereinafter with reference to the accompanying drawings; however, they may be embodied in different forms and should not be construed as limited to the embodiments set forth herein. Rather, these embodiments are provided so that this disclosure is thorough and complete, and fully conveys the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
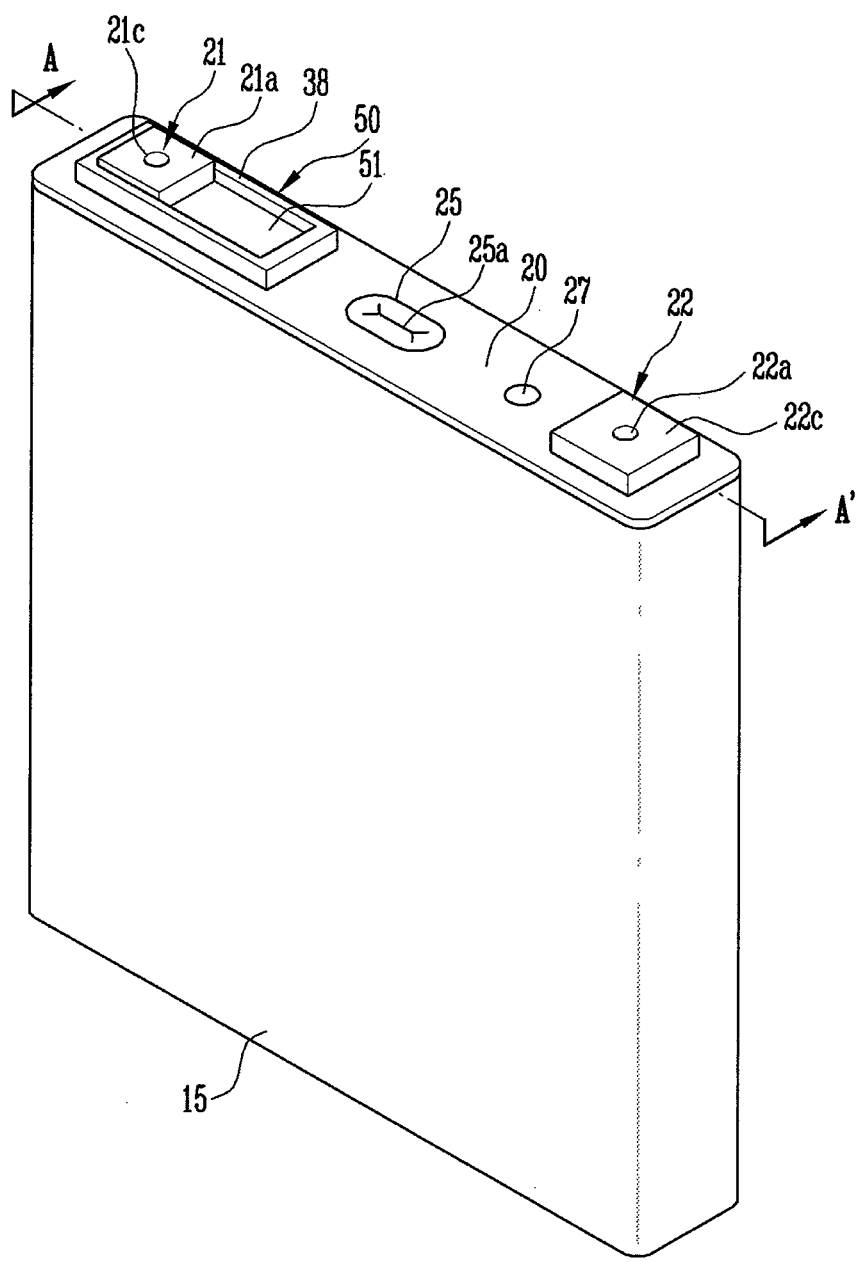
FIG. 1 is a perspective elevation view of a secondary battery according to the present invention.

The invention is described more fully hereinafter with reference to the accompanying drawings, in which example embodiments of the inventions are shown. While a preferred embodiment of the invention may be described using specific terms, such description is for illustrative purposes only, and it is to be understood that changes and variations may be made without departing from the spirit or scope of the following claims.

In the following description, a detailed description of a known function or configuration related to the invention may be omitted if such description renders the subject matter of the invention unclear. Further, like reference numerals are used to identify like elements throughout different figures. For clarity and convenience of description, the size or shape of elements shown in the figures may not be illustrated to scale.

Figure 2:
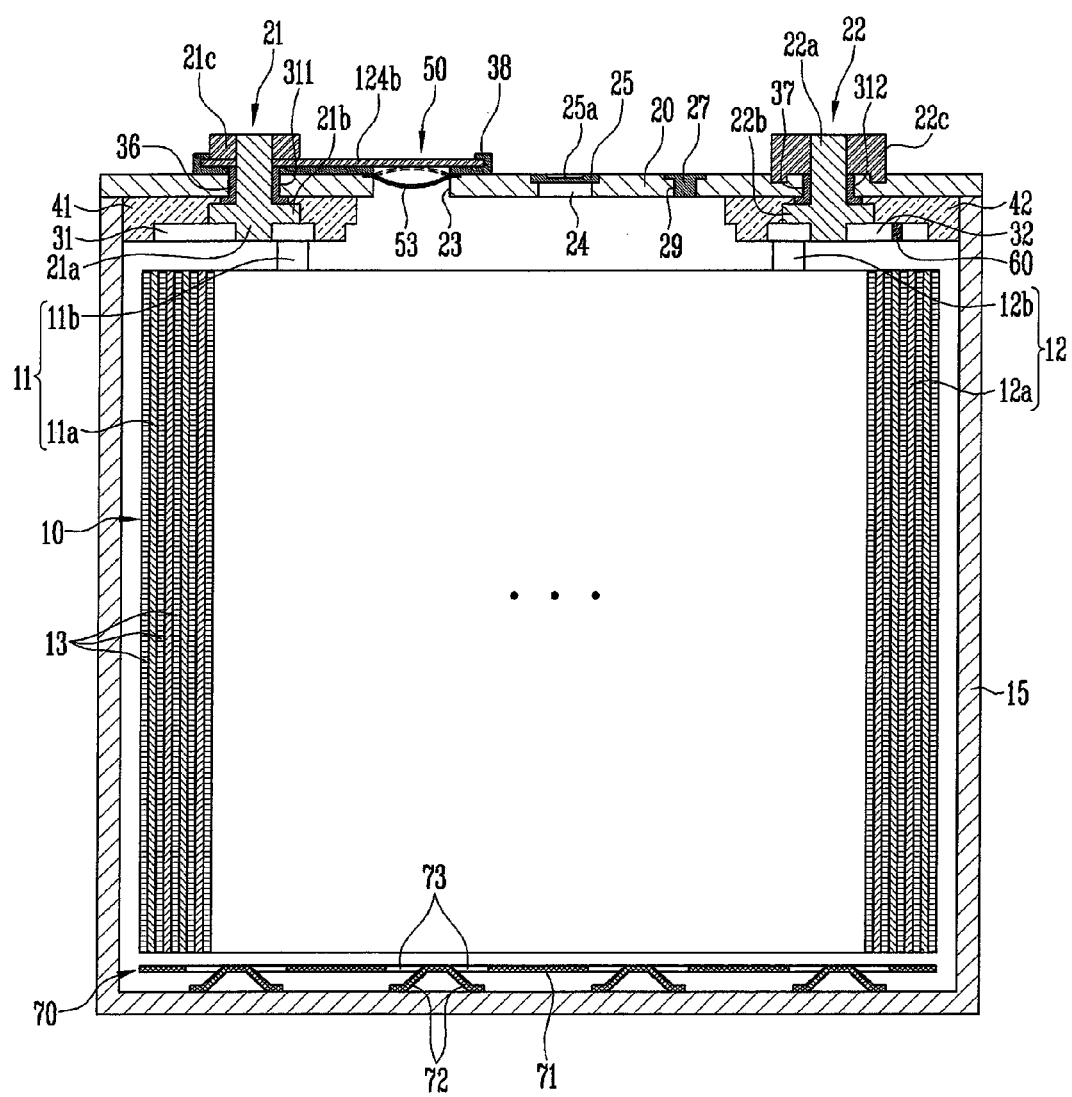
FIG. 2 is a cross-sectional view taken along line A-A' of FIG. 1.

FIG. 1 is a perspective elevation view of a secondary battery according to the present invention, and FIG. 2 is a cross-sectional view taken along line A-A' of FIG. 1.

Referring to FIGS. 1 and 2, the secondary battery according to the present invention may include an electrode assembly 10, a first lead tab 31, a second lead tab 32, a case 15 accommodating the electrode assembly 10, the first lead tab 31, and the second lead tab 32 and having a top and a bottom, the top of the case 15 having an opening, and a cap plate 20 configured to close the opening of the case 15. Further, the secondary battery includes a first electrode terminal 21 (hereinafter referred to as a "cathode terminal") and a second electrode terminal 22 (hereinafter referred to as an "anode terminal") which are provided on the cap plate 20, an external short-circuit portion 50 provided around (or near) the cathode terminal 21, and a fuse portion 60 provided around (or near) the anode terminal 22.

A plate-shaped bottom retainer 70 is disposed on or at the bottom of the case 15 (i.e., at an upper surface of the bottom of the case 15 or on the bottom interior of the case 15). The bottom retainer 70 includes a support portion 71 that supports the electrode assembly 10, and at least one contact portion 72 that contacts the bottom of the case 15. As such, the support portion 71 of the bottom retainer 70 may be formed in the shape of a plate, and the contact portion 72 may extend from a bottom side of the support portion 71 toward the bottom of the case 15.

Further, at least one hole 73 may be formed in the support portion 71, thereby improving the flow of an electrolyte between the bottom of the case 15 and the bottom retainer 70. Thus, the hole 73 may function as a passage to allow the electrolyte, which is collected between the bottom of the case 15 and the bottom retainer 70 and is not absorbed by the electrode assembly 10, to flow smoothly. In addition, the bottom retainer 70 may be made of an insulating material to be insulated from the electrode assembly 10.

Hereinafter, respective elements of the secondary battery according to the present invention are described.

The electrode assembly 10 may be used to charge or discharge an electric current. According to embodiments of the present invention, the electrode assembly 10 is formed by placing a first electrode 11 (hereinafter referred to as a "cathode") and a second electrode 12 (hereinafter referred to as an "anode") on opposite sides of a separator 13 (that is an insulator), and then winding the cathode 11, the separator 13 and the anode 12 in a jelly-roll form. The cathode 11 and the anode 12 include a coating portion 11a, 12a and a non-coating portion 11b, 12b, respectively. The coating portion 11a, 12a is formed by applying an active material to a current collector of a metal plate. The non-coating portion 11b, 12b is exposed because no active material is applied thereto. The non-coating portion 11b of the cathode 11 and the non-coating portion 12b of the anode 12 protrude upward from the electrode assembly 10.

The case 15 has the shape of a rectangular parallelepiped to define a space for receiving the electrode assembly 10 and the electrolyte therein. The case 15 includes an opening formed in a surface of the rectangular parallelepiped that allows the electrode assembly 10 to be inserted into the case 15.

The cap plate 20 is made of a thin steel sheet that is mounted to the opening of the case 15, thus closing the case 15. The cap plate 20 further includes an electrolyte inlet port 29 and a vent hole 24. After the cap plate 20 is coupled to the case 15, the electrolyte inlet port 29 allows the electrolyte to be injected into the case 15. After the electrolyte has been injected, the electrolyte inlet port 29 is sealed by a sealing stopper 27.

The vent hole 24 may be used for discharging an internal pressure of the secondary battery. The vent hole 24 is closed by a vent plate 25 having a notch 25a. If the internal pressure of the secondary battery reaches a preset level, the vent plate 25 is cut by the notch 25a to open the vent hole 24.

The cathode terminal 21 and the anode terminal 22 pass through the cap plate 20 and are electrically connected to the electrode assembly 10. That is, the cathode terminal 21 is electrically connected to the cathode 11 of the electrode assembly 10, and the anode terminal 22 is electrically connected to the anode 12 of the electrode assembly 10.

Portions of the cathode terminal 21 and the anode terminal 22 inside the cap plate 20 have the same general structure. Accordingly, the following description refers to both the cathode and anode terminals 21, 22 for features of the cathode and anode terminals 21, 22 inside the cap plate 20. However, since portions of the cathode terminal 21 and the anode terminal 22 outside the cap plate 20 have different structures, features of the cathode and anode terminals 21, 22 outside the cap plate are described separately.

The cathode and anode terminals 21, 22 each include a rivet terminal 21a, 22a, a flange 21b, 22b, and a plate terminal 21c, 22c, respectively. The rivet terminals 21a, 22a are installed in a respective terminal hole 311, 312 of the cap plate 20. The flanges 21b, 22b are provided inside the cap plate 20, and extend widely to be integrated with the rivet terminals 21a, 22a, respectively. The plate terminals 21c, 22c are disposed outside the cap plate 20 to be connected to the rivet terminals 21a, 22a, respectively, by riveting or welding.

The cathode and anode gaskets 36, 37 are installed between the rivet terminals 21a, 22a of the cathode and anode terminals 21, 22 and an inner surface of the terminal holes 311, 312 of the cap plate 20, respectively, thus sealing a gap between the rivet terminals 21a, 22a of the cathode and anode terminals 21, 22 and the cap plate 20. The cathode and anode gaskets 36, 37 extend further between the flanges 21b, 22b and the inner surface of the cap plate 20, respectively, thus further sealing a gap between the flanges 21b, 22b and the cap plate 20. That is, the cathode and anode gaskets 36, 37 are installed around the cathode and anode terminals 21, 22 on the cap plate 20, respectively, thus preventing the electrolyte from leaking out through the terminal holes 311, 312.

Meanwhile, the cathode and anode lead tabs 31, 32 electrically connect the cathode and anode terminals 21, 22 to the cathode and anode non-coating portions 11b, 12b of the electrode assembly 10, respectively. That is, the cathode and anode lead tabs 31, 32 are coupled to a lower end of the rivet terminals 21a, 22a, respectively, and caulking is performed on the lower end, so that the cathode and anode lead tabs 31, 32 are connected to the lower end of the rivet terminals 21a, 22a while being supported by the flanges 21b, 22b, respectively.

Embodiments of the present invention may also be applied to a secondary battery having two or more electrode assemblies. In these embodiments, the plurality of cathode and anode non-coating portions 11b, 12b may be electrically connected by the cathode and anode lead tabs 31, 32, respectively.

The cathode and anode insulation members 41, 42 are provided between the cathode and anode lead tabs 31, 32 and the cap plate 20, respectively, thus electrically insulating the cathode and anode lead tabs 31, 32 from the cap plate 20. Further, one side of the cathode and anode insulation members 41, 42 is coupled to the cap plate 20, while the other side thereof surrounds the cathode and anode lead tabs 31, 32, the rivet terminals 21a, 22a and the flanges 21b, 22b, respectively, thereby substantially stabilizing a connecting structure thereof.

Referring to FIG. 2, the external short-circuit portion 50 includes a short-circuit tab 51 and a short-circuit member 53, which are spaced apart from each other or cause a short circuit depending on the internal pressure.

The short-circuit tab 51 is electrically connected to the rivet terminal 21a of the cathode terminal 21, and is disposed outside the cap plate 20 with an insulation member 38 interposed between the short-circuit tab 51 and the cap plate 20. The insulation member 38 is provided between the short-circuit tab 51 and the cap plate 20, thereby electrically insulating the short-circuit tab 51 and the cap plate 20 from each other. That is, the cap plate 20 is electrically insulated from the cathode terminal 21.

The short-circuit tab 51 and the terminal plate 21c are placed on an upper end of the rivet terminal 21a, and then caulking is performed on the upper end thereof, so that the short-circuit tab 51 and the terminal plate 21c are coupled to the upper end of the rivet terminal 21a. Thus, the short-circuit tab 51 and the terminal plate 21c are fixedly supported on the cap plate 20 with the insulation member 38 interposed therebetween.

A short-circuit member 53 is installed in a short-circuit hole 23 of the cap plate 20. The short-circuit tab 51 is connected to the cathode terminal 21 and extends toward the short-circuit member 53. Thus, the short-circuit tab 51 and the short-circuit member 53 face each other in the short-circuit hole 23 and are spaced apart from each other (illustrated in FIG. 2 as a solid line) or contact each other to cause a short circuit (illustrated in FIG. 2 as a dashed line).

When the internal pressure of the secondary battery rises, the short-circuit member 53 is deformed and contacts the short-circuit tab 51. Thus, the short-circuit tab 51 is electrically connected to the cap plate 20, to maintain the short-circuit state of the electrode assembly 10. In the event of the short circuit, a high-voltage current is instantaneously discharged between the cathode and anode terminals 21 and 22 through the short-circuit tab 51 and the short-circuit member 53. Then, the fuse portion 60 may be melted and cut in a discharge line connecting the electrode assembly 10 with the cathode and anode terminals 21 and 22.

When the fuse portion 60 is melted and cut as such, arcing may be produced at a cut point. As such, arc debris drops to the bottom of the case 15, and may melt or damage the bottom of the case 15. However, such a problem may be prevented by the bottom retainer 70 disposed on the bottom of the case 15, according to the present invention.

The bottom retainer 70 according to the present invention includes a plate-shaped support portion 71 that supports the electrode assembly 10, and a contact portion 72 that extends from a lower surface of the support portion 71 to an upper surface of the bottom of the case 15. Thus, even if the secondary battery is shocked, the contact portion 72 performs a tension function, thus preventing the jelly roll from being unwound when the electrode assembly 10 vibrates up and down, and thereby improving safety.

Further, external shocks may be absorbed by the bottom retainer 70, thus enhancing the durability of the secondary battery. Moreover, the bottom retainer 70 includes the hole 73, so that gas may be smoothly discharged from the electrode assembly 10 when a fault occurs in the secondary battery, thus improving safety and quality of the secondary battery.

Figure 3A:
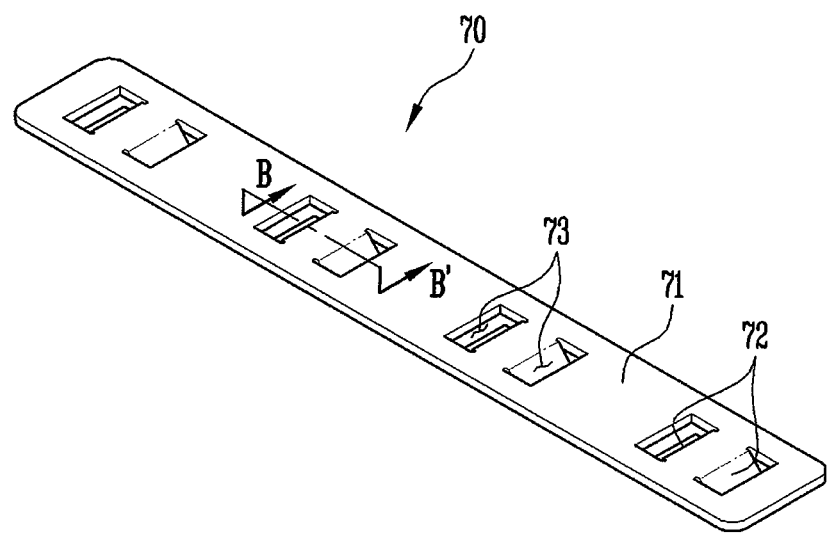
FIG. 3A is a perspective view of a bottom retainer according to one or more embodiments of the present invention.
Figure 3B:
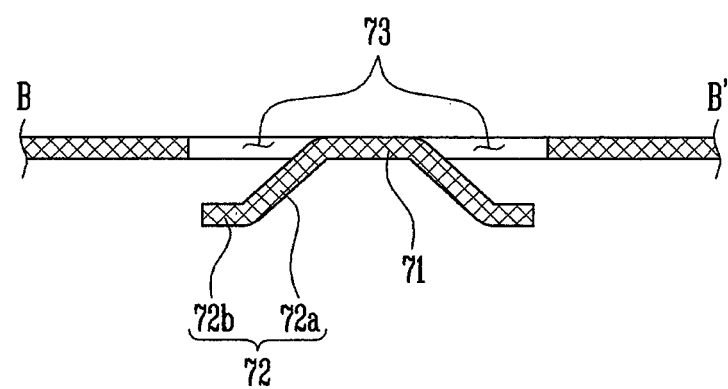
FIG. 3B is a cross-sectional view taken along line B-B' of FIG. 3A.

FIG. 3A is a perspective view showing a bottom retainer according to one or more embodiments of the present invention, and FIG. 3B is a cross-sectional view taken along line B-B' of FIG. 3A.

Referring to FIGS. 3A and 3B, the bottom retainer 70 is disposed on an upper surface of the bottom of the case 15 (i.e., the bottom surface inside the case 15), and includes a support portion 71 to support the electrode assembly 10 and at least one contact portion 72 to make contact with the bottom of the case 15. The bottom retainer 70 is made of an insulating material, thereby insulating the bottom of the case 15 and the electrode assembly 10.

The support portion 71 of the bottom retainer 70 may be formed in the shape of a flat plate. Further, the contact portion 72 of the bottom retainer 70 may extend from a lower surface of the support portion 71 toward an upper surface of the bottom of the case 15.

The contact portion 72 includes an inclined portion 72a and a horizontal portion 72b. The inclined portion 72a extends obliquely from the support portion 71 toward the bottom of the case 15. The horizontal portion 72b is formed on an end of the inclined portion 72a and substantially parallel to the bottom of the case 15. Since the bottom of the case 15 contacts the horizontal portion 72b, the bottom retainer 70 can more stably support the electrode assembly 10.

The contact portion 72 of the bottom retainer 70 may continuously push the electrode assembly 10 upward, thus preventing the electrode assembly 10 from being unwound due to its weight and vertical vibrations.

Further, the contact portion 72 may be configured such that inclined portions 72a are adjacent to each other by twos or in pairs. The adjacent inclined portions 72a may be spaced apart a first distance at a portion adjacent the support portion 71 and may be spaced apart a second distance at a portion adjacent the horizontal portion 72b, wherein the second distance is greater than the first distance. In one embodiment, a gap between the inclined portions 72a adjacent to each other may be gradually widening from the portion adjacent the support portion 71 toward the portion adjacent the horizontal portion 72b.

At least one hole 73 is formed in the support portion 71. In one embodiment, the hole 73 may be formed in the support portion 71 and positioned above the contact portion 72. As such, the hole 73 formed in the support portion 71 may allow the electrolyte to flow smoothly.

Figure 4:
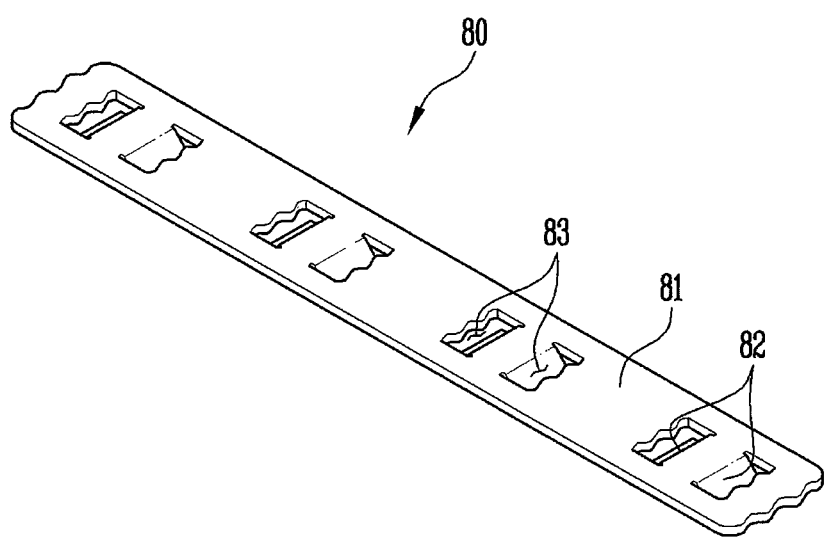
FIG. 4 is a perspective view of a bottom retainer according to one or more embodiments of the present invention.

FIG. 4 is a perspective view showing a bottom retainer according to one or more embodiments of the present invention.

Referring to FIG. 4, the bottom retainer 80 according to one or more embodiments of the present invention includes a support portion 81 that is generally plate-shaped, and a contact portion 82 extending from a lower side of the support portion 81 toward an upper surface of the bottom of the case 15.

A plurality of contact portions 82 is provided in such a way as to be adjacent to each other by twos (or in pairs). The adjacent contact portions 82 may be spaced apart a first distance at a portion adjacent the support portion 81 and may be spaced apart a second distance at a portion adjacent the bottom of the case 15, wherein the second distance is greater than the first distance. In one embodiment, a gap between the contact portions 82 adjacent to each other may be gradually widening from the portion adjacent the support portion 81 toward the portion adjacent the bottom of the case 15. Further, a plurality of holes 83 may be formed in the support portion 81 creating a passage that allows the electrolyte to flow smoothly.

According to one or more embodiments, at least a portion of the edge of each hole 83 may have a wave pattern, and at least a portion of the edge of the support portion 81 may have a wave pattern. The hole 83 may be formed in a rectangular shape, and the edge of the hole 83 parallel to the short side of the case 15 may be formed in a wave pattern. Further, the edge of the support portion 81 of the bottom retainer 80 that contacts the short side of the case 15 may also be formed in a wave pattern.

As such, the bottom retainer 80 continuously pushes the electrode assembly 10 upward. This configuration may prevent a gas discharged from the electrode assembly 10 from becoming clogged when a fault occurs in the secondary battery by creating a flow path. Further, the strength of the bottom retainer 80 may be reinforced by the support portion 81 of the wave pattern.

Figure 5A:
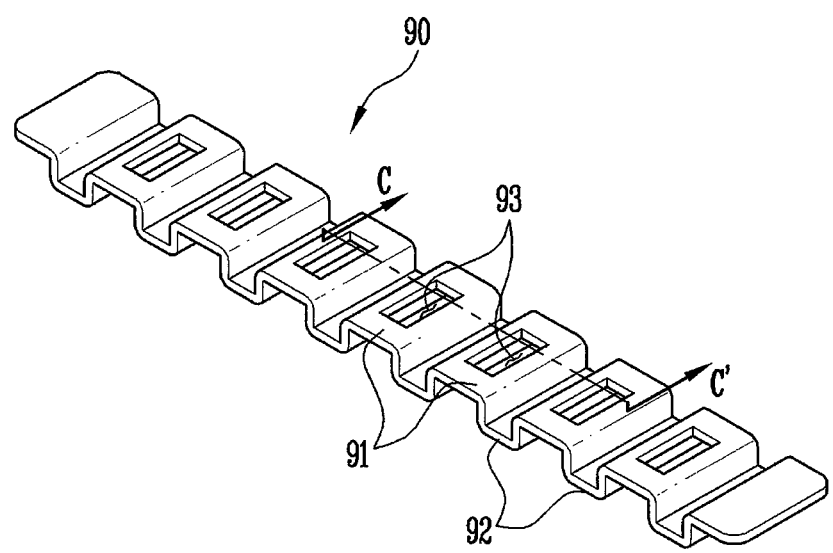
FIG. 5A is a perspective view of a bottom retainer according to one or more embodiments of the present invention.
Figure 5B:
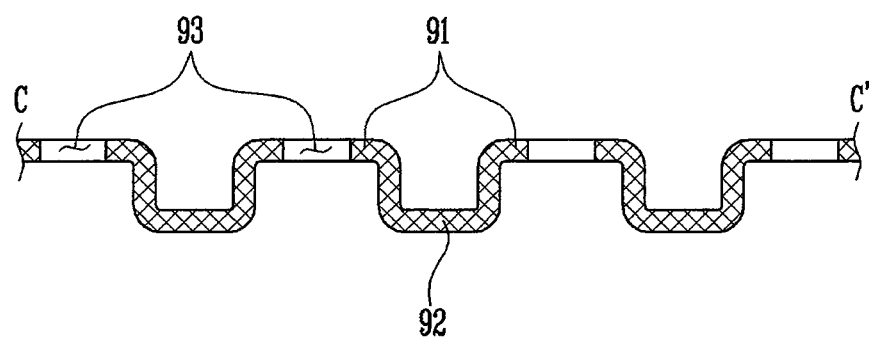
FIG. 5B is a cross-sectional view taken along line C-C' of FIG. 5A.

FIG. 5A is a perspective view showing a bottom retainer according to one or more embodiments of the present invention, and FIG. 5B is a cross-sectional view taken along line C-C' of FIG. 5A.

Referring to FIGS. 5A and 5B, the bottom retainer 90 according to one or more embodiments of the present invention includes support portions 91 that support the electrode assembly 10, and contact portions 92 that contacts an upper surface of the bottom of the case 15.

The support portions 91 and the contact portions 92 are alternately formed. As such, a vertical section of the bottom retainer 90 that contacts a long side of the case 15 may be formed in an embossing shape. That is, the bottom retainer 90 takes the embossing shape due to a height difference between the support portions 91 supporting the electrode assembly 10 and the contact portions 92 contacting the bottom of the case 15.

Further, at least one hole 93 is formed in each support portion 91, providing a passage that allows the electrolyte to flow between the bottom retainer 90 and the bottom of the case 15. Since the bottom retainer 90 does not completely come into close contact with the bottom of the case 15, the electrolyte may be collected in the bottom of the case 15. However, since the hole 93 is formed in each support portion 91 of the bottom retainer 90, it is possible to prevent the electrolyte from being collected in the bottom of the case 15.

Example embodiments are disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly comprising a first electrode, a second electrode, and a separator between the first and second electrodes;
   a bottom retainer;
   a case having a top and a bottom, and accommodating the electrode assembly and the bottom retainer therein, the bottom retainer being on the bottom of the case; and
   a cap plate sealing the top of the case;
   wherein the bottom retainer comprises:
      a planar support portion supporting the electrode assembly and being entirely spaced from the bottom of the case, a lowermost portion of the electrode assembly being above an uppermost portion of the support portion;
      at least one contact portion extending from the support portion towards the bottom of the case to space the support portion from the bottom, wherein the at least one contact portion contacts the bottom of the case; and
      at least one opening on the support portion through which electrolyte can flow to the bottom of the case.

2. The secondary battery of claim 1, wherein the support portion of the bottom retainer is substantially flat and plate-shaped.

3. The secondary battery of claim 2, wherein the contact portion of the bottom retainer extends from a bottom surface of the support portion toward the bottom of the case.

4. The secondary battery of claim 3, wherein the contact portion comprises an inclined portion that extends obliquely from the support portion toward the bottom of the case, and a horizontal portion that extends from an end of the inclined portion and parallel to the bottom of the case.

5. The secondary battery of claim 4, wherein the contact portion comprises two inclined portions adjacent to each other, the inclined portions adjacent to each other being inclined and spaced apart a first distance at a portion adjacent the support portion and spaced apart a second distance at a portion adjacent the horizontal portion, wherein the second distance is greater than the first distance.

6. The secondary battery of claim 1, wherein the opening is located above the contact portion.

7. The secondary battery of claim 1, wherein at least a portion of an edge of the opening has a wave pattern.

8. The secondary battery of claim 1, wherein at least a portion of an edge of the support portion has a wave pattern.

9. The secondary battery of claim 1, wherein the support portion and the contact portion are alternately arranged, and wherein a vertical section of the bottom retainer contacting a side of the case is embossed.

10. The secondary battery of claim 1, wherein the bottom retainer comprises an insulation member.

11. The secondary battery of claim 1, wherein the support portion comprises:
- a first planar support portion supporting the electrode assembly; and
- a second planar support portion supporting the electrode assembly, and
- wherein the at least one contact portion is located between the first planar support portion and the second planar support portion.

12. The secondary battery of claim 1, wherein the case has a length in a first direction and a width in a second direction crossing the first direction, the length of the case being greater than the width of the case, and
- wherein the at least one contact portion extends from the support portion along the first direction.

* * * * *